March 3, 1959

T. L. KNIGHT ET AL 2,875,598

MECHANICAL COUPLER

Filed March 13, 1956

THEODORE KNIGHT
WILLIAM BICHELL
*INVENTORS*

BY

*Killman and Kerst*
ATTORNEYS

United States Patent Office 2,875,598
Patented Mar. 3, 1959

2,875,598

MECHANICAL COUPLER

Theodore L. Knight and William J. Bichell, Baltimore, Md., assignors to Bendix Aviation Corporation, Towson, Md., a corporation of Delaware Application March 13, 1956, Serial No. 571,241

3 Claims. (Cl. 64—15)

This invention relates to a means for coupling two shafts. It finds particular advantage in installations in which space, weight, size and complexity of parts are important limitations and where alignment and backlash problems exist.

It is an object of this invention to provide means for coupling two shafts, which means is simple, inexpensive, light in weight and small in size.

It is a further object to provide such a means by means of which connection and disconnection of the shafts are easily and quickly accomplished.

It is another object to provide a coupling means which substantially eliminates the backlash attendant upon the use of gears or other toothed couplings.

It is a still further object to provide a coupling means which functions properly even in the presence of angular or linear misalignment between the coupled mechanisms.

These and other objects and advantages of the invention are realized by a coupling arrangement in which a shaft provided at its coupling end with a pair of opposed, parallel, flat surfaces is joined with another shaft by means of a plate-like member having formed therein a cylindrical bore into which the end of the shaft is inserted. The bore may be larger in diameter than the circular diameter of the shaft to allow for misalignment and to partially align the shafts. The plate-like member has a pair of rod shaped springs secured near their ends to the surface thereof. The shaft is inserted between these rods. The rods lie in parallelism across the bore and equally distant from its axis. Their separation is such that the end of the shaft must be forced between them. For polarizing purposes a pin on the end of the shaft may be received into a recess opening into one side of the bore. The rod-shaped springs may be joined at one end to form a hairpin type spring, if desired.

Figure 1:
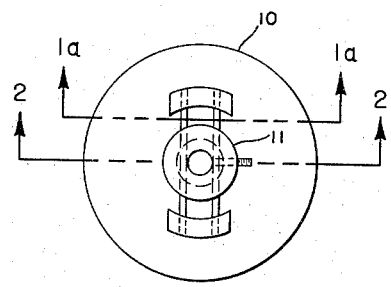
Fig. 1 is an elevational view of a plate-like member suitable for use in the invention.
Figure 1A:
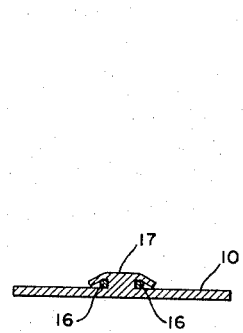
Fig. 1a is a view in section, taken along the line 1a—1a of Fig. 1.
Figure 2:
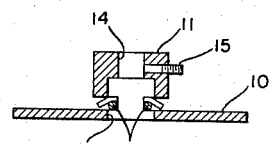
Fig. 2 is a view in section, taken along the line 2—2 of Fig. 1.
Figure 3:
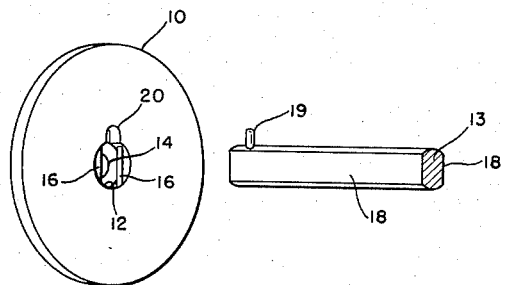
Fig. 3 is a perspective view of an assembly, including a fragment of the member of Fig. 1, embodying the invention.

Referring now more particularly to the drawing, there is shown in Figs. 1 and 2 a plate-like member 10 forming part of the preferred form of the invention. The member 10 is provided with extending hub 11, coaxial therewith and protruding from one side thereof. The member 10 is formed with a central bore 12, intended to receive the end of the shaft, which forms a part of the coupling mechanism, and is shown at 13 in Fig. 3. The bore 12 has a diameter slightly larger than that of the shaft 13 to allow for misalignment.

The hub 11 is shown as provided with a smaller bore 14, for receiving another shaft, which is not shown, from the driving part of the mechanism which is being coupled. Such a small bore may act as a stop to limit the insertion of the shaft 13. It is not necessary to the invention, however, and it should be understood that the bore 14 may be the same size as the bore 12 or any size necessary to accommodate the other shaft. A set screw 15, or other conventional fastening means, is provided for securing the hub to the shaft.

On the same side of the member 10 as the hub are a pair of rod-like spring elements 16. These elements are secured near each of their ends by an arm of a T-shaped boss 17, formed on the member 10, the arm being bent down over the element. This fastening means is shown only by way of example, since there are obviously many standard fastening means which could be used for the purpose. The rods 16 lie against the member 10 and extend in parallelism, equidistant from the axis of the member. At their mid points they pass through the edge portions of the bore 12, as indicated most clearly in Fig. 3.

The remaining portion of the coupling mechanism consists of the shaft 13, provided at its coupling end with two opposing flat surfaces 18. At the coupling end of the shaft is a polarizing pin 19 extending laterally from the shaft. At the edge of the bore 12 in the member 10 is formed a recess 20 to receive the pin 19.

Figure 5:
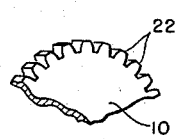
Fig. 5 is a view similar to that of Fig. 4 with the periphery of the member provided with gear teeth.
Figure 4:
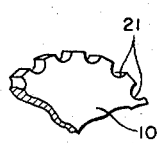
Fig. 4 is a perspective view of a fragment of the member of Fig. 1 with its periphery provided with detenting recesses.

The rim of the member 10 may be left plain, or it may be provided with detenting recesses 21, as shown in Fig. 4. Another alternative is to provide it with gear teeth 22, as shown in Fig. 5.

Figure 7:
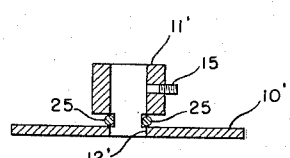
Fig. 7 is a view in section, taken along the line 7—7 of Fig. 6.
Figure 6:
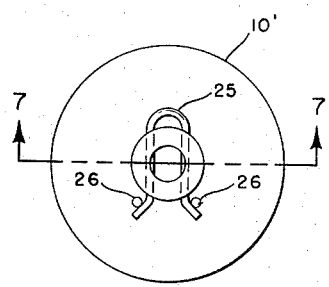
Fig. 6 is an elevational view of an alternative form of the plate-like member.

An alternative form of the invention is illustrated in Figs. 6 and 7. In this form the spring rods have been joined at one end to form a hairpin shaped spring 25, which passes through the two slots formed in the hub 11' as in Fig. 1. The slots are deep enough so that the parallel branches of the spring 25 pass through the opposed edge portions of the bore 12'. The hub 11' and plate 10' are shown as formed with only one bore which is to receive both shafts, but a pair of bores, such as the bores 12 and 14 of Figs. 1 and 2, may be used if it is desired that the smaller bore act as a limit stop for the shaft 13 or the bore 14 may be larger than the bore 12, if desired.

A pair of pins 26 erected from the plate 10' secure the ends of the spring 25 from movement, the resilience of the spring and the bottoms of the slots cut in the hub holding the spring ends firmly against the pins.

In the operation of both forms of the invention the end of the shaft 13 is forced between the springs 16 or the arms of the spring 25 into the bore 12 or 12'. Where polarizing means, such as the pin 19 and recess 20, are provided, they restrict the parts to one angular orientation.

The coupling members are easily connected or disconnected by a single manual movement. The coupling, due to the resilience of the shaft confining spring members, has no backlash or chattering and the differences in the sizes of the shaft 13 and the bores that receive it, allow for both angular and linear misalignment without loss of coupling accuracy.

In use, the plate like member is usually secured to the driving end of the mechanism and the shaft is usually a part of the driven portion. These relationships may, however, be reversed, if desired.

What is claimed is:

1. Coupling means comprising a plate-like member formed with a hub, said member and said hub having a bore extending therethrough perpendicularly of said member, a pair of spring elements of rod-like shape, means securing said elements adjacent one face of said member in a manner such that they lie in parallelism, symmetrical to and equidistant from the axis of said bore and separated by a distance which is less than the diameter of said bore, and the shaft having a diameter such that it may be received into said bore, said shaft being formed with two parallel opposing flat surfaces equidistant from and parallel to the axis thereof, the distance separating said surface being greater than the distance between said elements, the end of said shaft being received within said bore with said flat surfaces contacting and forcing apart said elements, said shaft and one portion of said bore being formed with mating irregularities, thereby insuring that said shaft will be received within said bore with a polarized angular orientation.

2. Coupling means comprising a plate-like member formed with a hub extending from one side thereof, said member having a bore extending therethrough coaxially of said hub, said hub having a pair of slots formed therein in the region of its juncture with said member, said slots extending inwardly from opposite sides of said hub and extending in parallelism with said member, a pair of spring elements of rod-like shape, means securing said elements in said slots against the face of said member in a manner such that they lie in parallelism, symmetrical to and equidistant from the axis of said bore and separated by a distance which is less than the diameter of said bore, and a shaft having a diameter less than that of said bore, said shaft being formed with two opposing parallel flat surfaces equidistant from and parallel to the axis thereof, the distance separating said surfaces being greater than the distance between said elements, the end of said shaft being received within said bore with said flat surfaces contacting and forcing apart said elements.

3. Coupling means comprising a plate-like member formed with a hub extending from one said thereof, said member and said hub having a bore extending therethrough coaxially of said hub, said hub being formed with a pair of opposed slots extending parallel to said member and intersecting portions of said bore, a pair of spring elements of rod-like shape, means securing said elements so that each passes through a respective one of said slots and is held against the bottom thereof, and a shaft having a diameter such that it may be received within said bore, said shaft being formed with two parallel opposing flat surfaces, equidistant from and parallel to the axis thereof, the distance separating said surfaces being greater than the distance separating said elements, the end of said shaft being received within said bore with said flat surfaces contacting and forcing apart said elements.

References Cited in the file of this patent
UNITED STATES PATENTS

| | | |
|---|---|---|
| 1,962,993 | Leece | June 12, 1934 |
| 2,100,232 | Barry | Nov. 23, 1937 |

FOREIGN PATENTS

| | | |
|---|---|---|
| 484,605 | France | Oct. 23, 1917 |
| 275,881 | Great Britain | Aug. 18, 1927 |